March 5, 1940.

E. J. CRANE ET AL 2,192,515

DUST SEPARATING AND COLLECTING DEVICE

Filed Sept. 3, 1938

INVENTORS
E. J. CRANE
D. T. SMITH
BY Emery Robinson
ATTORNEY

UNITED STATES PATENT OFFICE

2,192,515

DUST SEPARATING AND COLLECTING DEVICE

Edward J. Crane, Oak Park, and David T. Smith, Maywood, Ill., assignors to Western Electric Company, Incorporated, New York, N. Y., a corporation of New York Application September 3, 1938, Serial No. 228,348

6 Claims. (Cl. 183—77)

This invention relates to a dust separating and collecting device, and more particularly to a dust removing and collecting device for grinding machines.

An object of the invention is to provide a simple, inexpensive and efficient dust separating and collecting device.

In accordance with the above object, one embodiment of the invention contemplates a dust separating and collecting device comprising a cylindrical chamber within which a radial discharge fan produces a vortex of dust laden air from which the dust is discharged into an annular "dead-air" space within the chamber.

Figure 1:
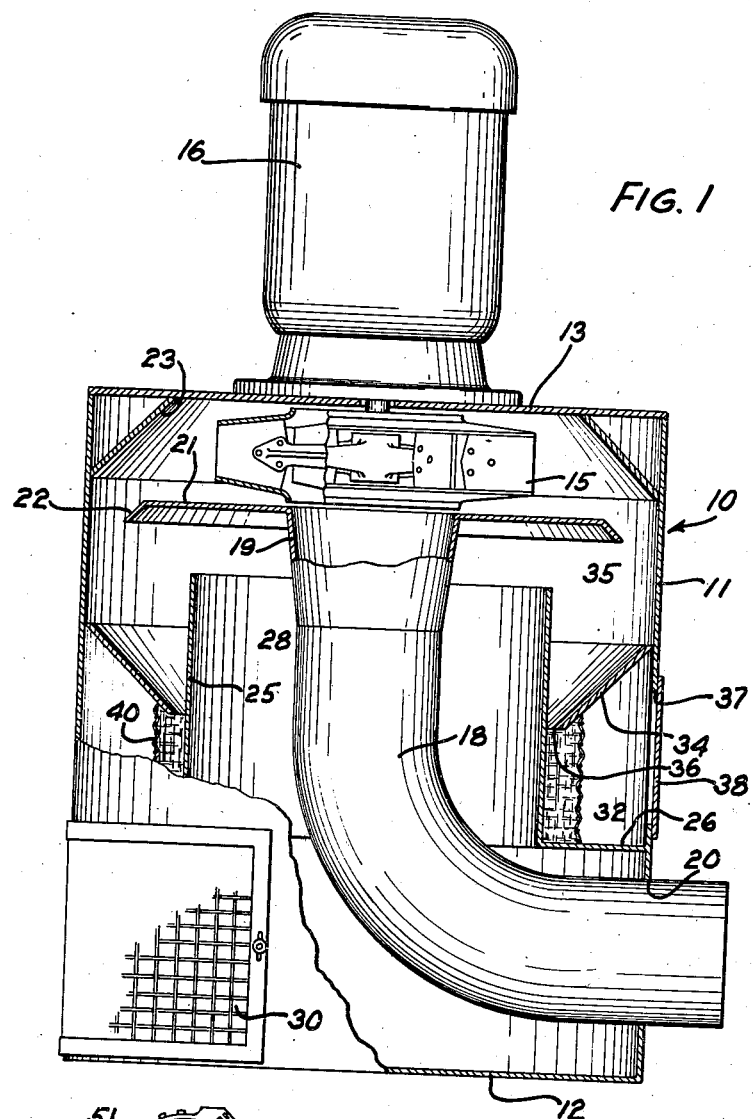
Figure 2:
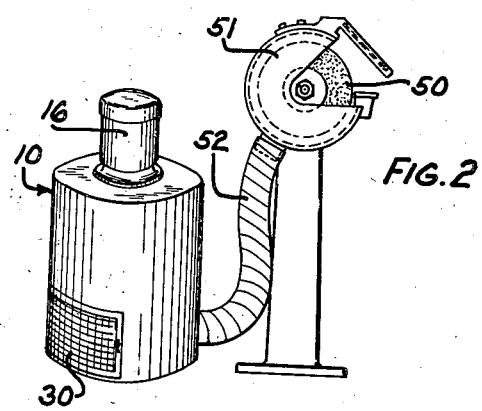

A more complete understanding of the invention may be had from the following detailed description when read in conjunction with the accompanying drawing, in which Fig. 1 is a vertical sectional view of a dust separating and collecting device embodying the invention, and Fig. 2 is an elevational view showing the device operatively connected to a grinding machine.

Referring to the drawing, the device illustrated therein comprises a cylindrical casing 10 having a cylindrical wall 11, a circular bottom plate 12 and a circular top plate 13. Coaxially mounted within the upper end of the casing is a centrifugal fan 15 adapted to be driven by a vertical motor 16 supported upon the top plate of the casing. The fan 15 is adapted to draw dust laden air through a curved inlet pipe 18 having an outwardly flared upper end portion 19 disposed immediately below the fan and coaxial therewith. The opposite end of the inlet pipe projects horizontally from the lower portion of the casing through an aperture 20 in the cylindrical wall 11.

A horizontal partition in the form of an annular plate 21 fits tightly around the upper end of the inlet pipe and is preferably formed with a depending conical peripheral flange 22, as shown. This partition plate is of smaller diameter than the casing, thus providing an annular opening therebetween through which the dust laden air is forced downwardly by the action of the fan, aided by a conical deflector 23 in the upper end of the casing.

A cylindrical partition 25 coaxially surrounds the vertical portion of the inlet pipe, the upper end of this partition being spaced below the horizontal partition plate 21, as illustrated. The lower end of the partition is spaced slightly above the horizontal portion of the inlet pipe and is welded or otherwise tightly secured to the inner periphery of a horizontal annular plate 26, which plate is welded or otherwise tightly secured along its outer periphery to the cylindrical outer wall 11 of the casing. The cylindrical partition forms an annular passage 28 around inlet pipe 18, through which the air discharged from the fan eventually passes downwardly into the bottom portion of the casing, whence it escapes through a suitable filter 30 in the outer wall of the casing.

Between the cylindrical partition 25 and the outer wall 11 there is provided an annular space, the lower portion of which serves as a dust collecting chamber 32, within which the dust is deposited. At the upper end of the dust collecting chamber, there is provided a funnel-like cover 34, the larger upper end of which is tightly secured to the outer wall 11 of the casing. The annular space 35 above the funnel 34 and below the annular plate 21 is hereinafter referred to as a dust separating chamber since the separation of the dust from the air takes place during the passage of the air through this chamber.

The lower end of the funnel is slightly larger than cylindrical partition 25, thus providing an annular opening 36 therebetween through which the separated dust passes into the dust collecting chamber 32. The outer wall is provided with an opening 37 through which the accumulated dust may be removed from the dust collecting chamber, and the opening is equipped with a removable tight fitting cover 38. A cylindrical screen 40 coaxially surrounds the cylindrical partition 25 and extends between the annular plate 26 and the lower end of funnel 34. This screen, it will be seen, serves to break up eddy currents which otherwise might sweep some of the fine dust from the bottom of the dust chamber and carry it up along the outer surface of the cylindrical partition 25 and around the upper edge thereof. Thus, the annular dust collecting space surrounding the screen constitutes what may be termed a "dead-air" space in that it is substantially free from air currents such as might disturb the dust particles deposited and collected therein.

In Fig. 2 of the drawing, the device is shown, by way of example, connected to a grinding machine having a power driven grinding wheel 50 partially enclosed within an exhaust hood 51. A flexible hose 52 connects the exhaust hood to the inlet pipe 18 of the dust separating device, so that the grinding dust is drawn through the hose and into the device by the suction created by the centrifugal fan 15.

In the operation of the device, the dust laden air is drawn, by the centrifugal fan, into the inlet pipe 18 and thence upwardly to the center of the fan. It is then whirled by the action of the fan radially outwardly, leaving the fan blade tips with a combination radial and tangential motion with respect to the axis of the device. By the continued action of the fan, the dust laden air is forced radially outwardly beyond the peripheral flange 22 of annular partition plate 21 and then downwardly along the outer cylindrical wall 11 and into the dust separating chamber 35. The dust laden air is then forced radially inwardly through the separating chamber, but due to its high tangential velocity, the action of centrifugal force on the heavier-than-air dust particles causes the dust to lag behind the radially inwardly moving air. The dust is thus separated from the air and eventually drops to the top surface of the funnel 34. It then slides down this funnel and passes downwardly through the annular opening 36, still having considerable tangential velocity which causes it to be thrown radially outwardly through the screen 40 and into the dust collecting chamber 36.

It will be noted that the partition plate 21 is of substantially larger diameter than the cylindrical partition 25, which insures sufficient inward movement of the whirling air through the separating chamber to effect substantially complete separation of the dust from the air before the air enters the outlet passage 28, through which it passes downwardly and then out through the filter 30.

It should be understood that the invention is not limited to the particular construction and embodiment thereof herein illustrated and described, except insofar as is defined by the appended claims.

What is claimed is:

1. A dust separating and collecting device, comprising a vertical casing of cylindrical cross section, a cylindrical partition coaxially mounted within the casing with its ends spaced from the top and bottom of said casing, an annular dust collecting chamber surrounding said partition, a funnel at the top of said dust chamber, said funnel coaxially surrounding said partition and having its bottom edge spaced therefrom to provide an annular passage leading into said dust chamber, and a dust separating chamber located above said funnel so that the separated dust drops on said funnel and is directed thereby into the dust chamber.

2. A dust separating and collecting device, comprising a cylindrical vertical casing having an annular dust collecting chamber, a dust separating chamber above said dust collecting chamber and communicating therewith, means for introducing dust laden air into the separating chamber and for forcing the dust laden air radially inwardly across said separating chamber with a whirling motion to effect centrifugal separation of the dust particles from the air, a funnel for directing the separated dust particles into said collecting chamber, and a screen across the inlet opening of said collecting chamber for eliminating dust disturbing air currents within said collecting chamber.

3. A dust separating and collecting device, comprising a cylindrical vertical casing having a dust collecting chamber, and a dust separating chamber above said dust collecting chamber, said separating chamber having a peripheral annular inlet passage, a central air outlet passage and an annular dust outlet passage surrounding the air outlet passage and leading into said dust collecting chamber.

4. A dust separating and collecting device, comprising a cylindrical vertical casing having a dust collecting chamber, a dust separating chamber above said dust collecting chamber, said separating chamber having a peripheral annular inlet passage leading into the top thereof, a central air outlet passage, and an annular dust outlet passage surrounding the air outlet passage and leading into said dust collecting chamber, and means for forcing a vortex of dust laden air into said separating chamber through said annular inlet passage.

5. A dust separating and collecting device comprising a cylindrical dust separating chamber having a peripheral annular inlet passage leading into the top thereof and a central air outlet passage concentric with and of smaller diameter than said inlet passage, and a dust collecting chamber having an annular inlet passage surrounding said air outlet passage and leading from the bottom of said separating chamber.

6. A dust separating and collecting device comprising a cylindrical vertical casing having a fan chamber in the upper end thereof, a centrifugal fan coaxially mounted within said fan chamber, a dust separating chamber below said fan chamber, and a dust collecting chamber below said separating chamber, said fan chamber having an annular outlet passage surrounding said fan and leading into said separating chamber, and said separating chamber having a central air outlet passage and an annular dust outlet passage surrounding said air outlet passage and leading into said collecting chamber.

EDWARD J. CRANE.
DAVID T. SMITH.